Patented Jan. 6, 1925.

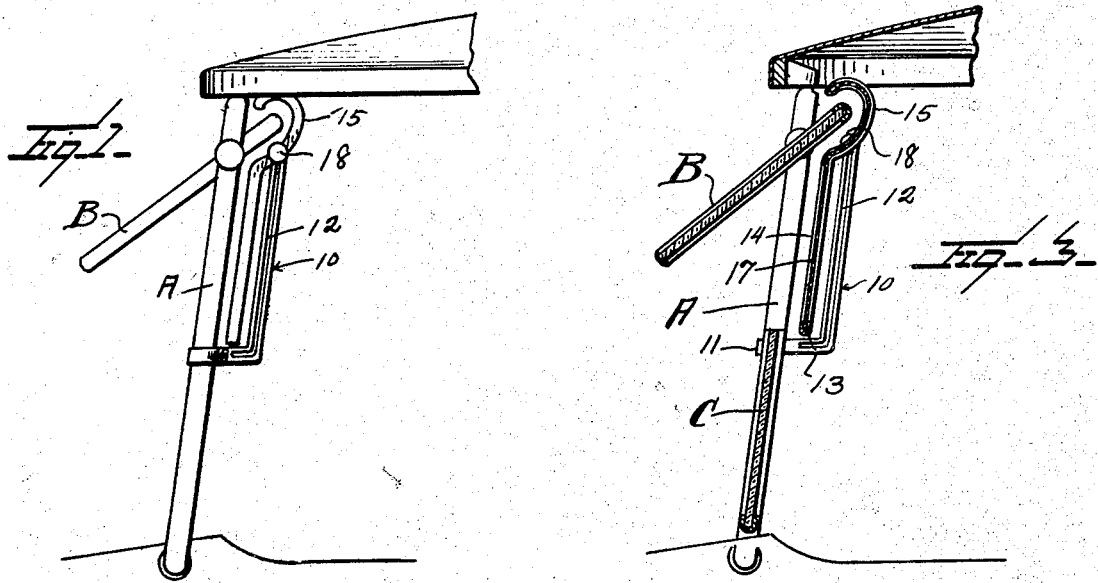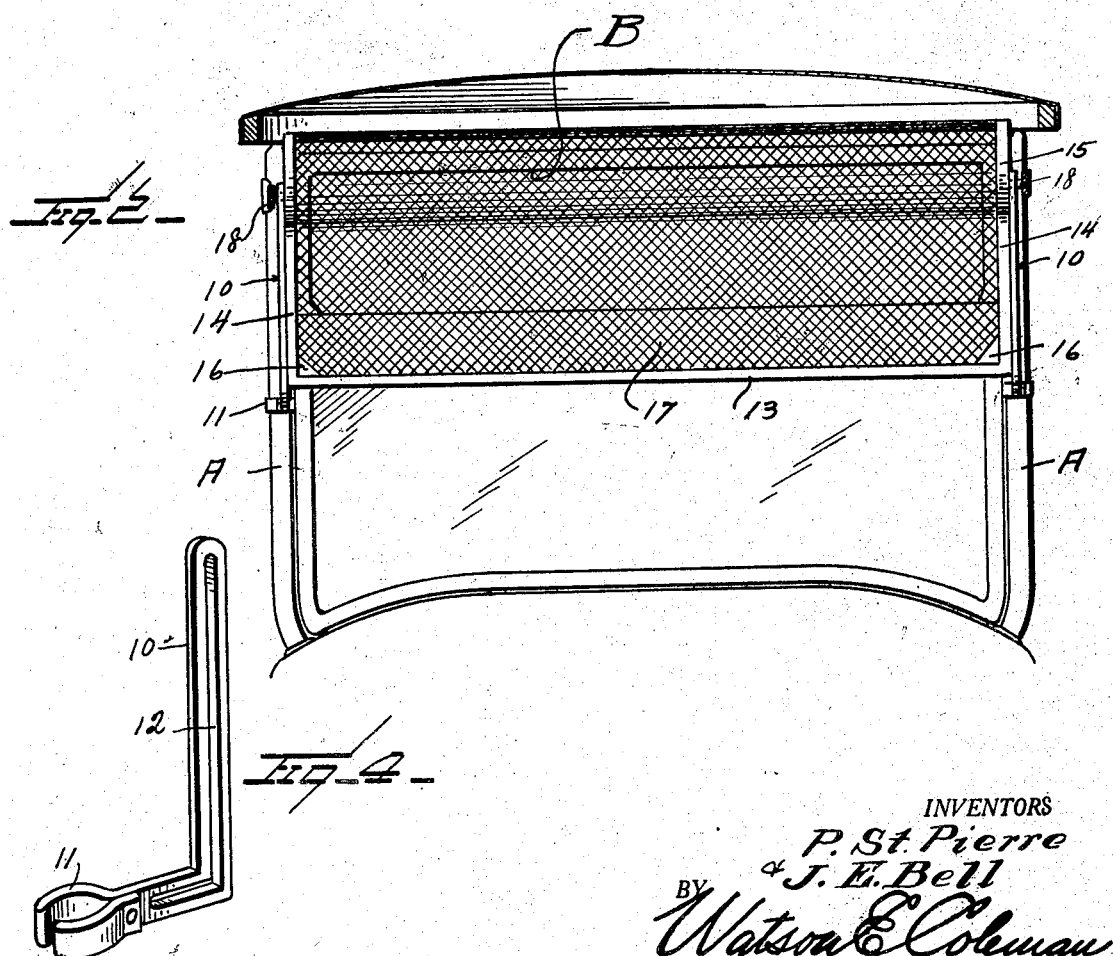

1,521,915

UNITED STATES PATENT OFFICE.

PERSEY ST. PIERRE AND JOSEPH E. BELL, OF CHICAGO, ILLINOIS.

SCREEN ATTACHMENT FOR WINDSHIELDS.

Application filed November 10, 1923. Serial No. 674,008.

*To all whom it may concern:*

Be it known that we, PERSEY ST. PIERRE and JOSEPH E. BELL, citizens of the United States, residing at Chicago, in the county of Cook and State of Illinois, have invented certain new and useful Improvements in Screen Attachments for Windshields, of which the following is a specification, reference being had to the accompanying drawings.

This invention relates to accessories or attachments for automobiles and has for its object the provision of a screen designed to be engaged upon the windshield of an automobile for the purpose of preventing insects, attracted by the head lights or drawn along by suction, from entering the car and striking the driver or other occupants.

It is well known that when traveling in an automobile, especially at night, insects pass through the open windshield and strike against the face, hands and body of the driver or other occupants, and it frequently occurs that bites and stings result in addition to the annoyance and danger caused by the striking of the insects against the eyes of the driver. We are aware that devices have been employed for screening the windshields but these existing structures have the disadvantage of necessitating alighting of the driver to effect manipulation of the screen to open or closed position, this defect occurring principally on account of the fact that the screens are located exteriorly of the windshield.

It is with the above facts in view that we have designed the present screen attachment which is located interiorly of the car and which is so constructed and arranged as to be capable of attachment to cars of any make, the screen proper being furthermore so formed as to accommodate the hinged edge of the windshield pane when it is swung into open position.

Another object is the provision of a screen attachment of this character which has the further advantage of acting as a glare shield to prevent the driver from being blinded by the glaring headlights of approaching cars.

An additional object is the provision of a device of this character which will be simple and inexpensive in manufacture and installation, easy to adjust, positive in action, efficient and durable in service, and a general improvement in the art.

With the above and other objects and advantages in view, the invention consists in the details of construction to be hereinafter more fully described and claimed, and illustrated in the accompanying drawings in which:—

Figure 1 is a side elevation of the device mounted upon the windshield of an automobile;

Figure 2 is a cross section through the forward portion of the car looking toward the windshield and showing the attachment in place;

Figure 3 is a vertical section through the windshield and the attachment showing the windshield in open position, and;

Figure 4 is a detail perspective view of one of the supporting brackets.

Referring more particularly to the drawing the letter A designates the upright side bars of an automobile windshield between which are pivotally mounted the panes or windshield sections B and C. It is well known that the windshield sections are capable of being swung into open position and generally they are so mounted that when opened the hinged edges project considerably into the car or inwardly of the plane of the upright bars A, this fact preventing the use of a flat screen disposable against the inside of the windshield frame.

In carrying out the present invention we provide a pair of curved or angular brackets 10 which are provided at their forward ends with clamps 11, or equivalent fastening means, adapted to be engaged upon the upright bars A of the windshield so that the brackets will be adequately supported therefrom in such position that they will project into the interior of the car to a certain extent. While the brackets are illustrated as being angular, it is obvious that they might be constructed in some other shape and also that they may be of any desired size, material and finish, depending upon the tastes of the individual manufacturer. Throughout their lengths the brackets 10 are formed with longitudinal slots 12 for a purpose to be described. While the brackets are shown and described as equipped with clamps for securing the windshield bars A it should be understood that if preferred they might be equipped with mere attaching feet which could be screwed or otherwise fastened to the opposite sides of the windshield opening in case the device is installed upon a car of the sedan type.

The screen proper comprises a frame 13 which is rectangular when viewed from the front or back, this frame being constructed preferably of metal such as a strip rolled, crimped or otherwise formed to have the proper rigidity. The frame 13 has its ends 14 shaped like an interrogation mark, or in other words, have curved or concave portions 15, the utility of which will be hereinafter made apparent. At its corners the frame is preferably braced by triangular plates 16 and the entire frame is covered with screen wire 17 of any desired material.

To effect mounting, we provide screws 18 which pass through the slots 12 in the brackets and which enter threaded holes in the ends 14 of the screen frame. These screws are so arranged and mounted that when screwed tightly into their sockets they will bear against the brackets 10 and operate to hold the screen in any desired adjusted position.

The screen is so disposed with respect to the brackets that the concaved or rearwardly curved portions 15 will accommodate the hinged edge of the windshield section when the windshield is open so that the line of the screen may lie comparatively close to the plane of the windshield instead of projecting a great distance inwardly and being in the way of the operator. Quite naturally the screen must be adjusted into such position that it will span the opening left by swinging a windshield section into its open position so as to exclude all insects which would otherwise enter the car. In actual practice the device also operates to dim the glare of approaching headlights so that the operator may see the road clearly and may avoid running off at the edge thereof or colliding with an approaching car. A distinct feature of advantage is that in case any adjustment of the screen is necessary such may be accomplished from the inside of the car so that the driver need not alight nor even stop.

From the foregoing description and a study of the drawing it will be apparent that we have thus provided a simply constructed and easily installed attachment which will be highly efficient for the purpose specified and which on account of its simplicity and fewness of parts is not likely to get out of order so that it should give entire satisfaction to those having occasion to employ its services.

While we have shown and described the preferred embodiment of the invention, it is to be understood that we reserve the right to make such changes in the form, construction and arrangement of parts as will not depart from the spirit of the invention or the scope of the subjoined claims.

We claim:—

1. A windshield attachment comprising a pair supporting brackets formed for connection with the sides of a vehicle windshield, and a screen covered frame vertically and angularly adjustably mounted upon said brackets and disposed inwardly of the windshield whereby to span the opening when a windshield section is opened, the upper portion of said screen frame being curved away from the windshield whereby to accommodate the hinged edge of a section in open position.

2. A windshield attachment comprising a pair of angular brackets equipped with means for connection with the side bars of a windshield frame and arranged to extend into the vehicle, said brackets being formed with elongated slots, a screen covered frame disposed between said brackets and located at the inside of the windshield, and screws passing through said slots and into the opposite ends of said frame for holding the screen in adjusted position, the screen having a curved portion accommodating the hinged edge of a windshield section when a section is swung to open position.

3. A windshield attachment comprising brackets formed for connection with the opposite sides of a windshield frame, a screen covered frame pivotally and slidably mounted upon said brackets and extending across the inside of the windshield, the screen having a curved portion accommodating the inner edge of a windshield section when the latter is swung into open position.

4. A device of the character described comprising a pair of L-shaped brackets carrying clamping means and engageable upon the sides of a windshield frame, the brackets being formed with elongated substantially vertically extending slots, and a screen frame pivotally and slidably mounted within said slots and adapted to span the opening resulting from swinging a windshield section into open position, the screen frame having its upper edge curved to permit opening of the windshield section without interference therewith.

In testimony whereof we hereunto affix our signatures.

PERSEY ST. PIERRE.
JOSEPH E. BELL.